United States Patent
Wang et al.

(10) Patent No.: US 12,425,945 B2
(45) Date of Patent: Sep. 23, 2025

(54) METHOD FOR SIDELINK RELAY COMMUNICATION UNDER DUAL CONNECTIVITY

(71) Applicant: ZTE CORPORATION, Guangdong (CN)

(72) Inventors: Mengzhen Wang, Shenzhen (CN); Wei Luo, Shenzhen (CN); Boyuan Zhang, Shenzhen (CN); Weiqiang Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 419 days.

(21) Appl. No.: 17/986,553

(22) Filed: Nov. 14, 2022

(65) Prior Publication Data

US 2023/0142993 A1    May 11, 2023

Related U.S. Application Data

(63) Continuation of application No. PCT/CN2020/090642, filed on May 15, 2020.

(51) Int. Cl.
*H04W 40/22*    (2009.01)
(52) U.S. Cl.
CPC .................. *H04W 40/22* (2013.01)
(58) Field of Classification Search
None
See application file for complete search history.

(56) References Cited

U.S. PATENT DOCUMENTS

| | | | |
|---|---|---|---|
| 10,616,940 B2* | 4/2020 | Vutukuri | H04W 4/70 |
| 12,047,802 B2* | 7/2024 | Rugeland | H04W 76/15 |
| 2018/0027429 A1* | 1/2018 | Li | H04W 8/24 |
| | | | 455/426.1 |
| 2018/0249516 A1* | 8/2018 | Jung | H04W 76/11 |
| 2018/0255499 A1 | 9/2018 | Loehr et al. | |
| 2018/0368191 A1 | 12/2018 | Vutukuri et al. | |
| 2020/0100124 A1* | 3/2020 | Hampel | H04W 24/02 |
| 2020/0146048 A1* | 5/2020 | Lee | H04W 72/535 |
| 2020/0196225 A1* | 6/2020 | Wang | H04W 76/11 |
| 2020/0374961 A1* | 11/2020 | Ingale | H04W 76/20 |
| 2022/0408396 A1* | 12/2022 | Youn | H04W 76/34 |

FOREIGN PATENT DOCUMENTS

| | | |
|---|---|---|
| CN | 110366206 A | 10/2019 |
| CN | 110383895 A | 10/2019 |
| CN | 110383915 A | 10/2019 |

(Continued)

OTHER PUBLICATIONS

Ericsson, "Relay UE selection in coverage" 3GPP TSG-RAN WG2 #91 Tdoc, R2-153481, Aug. 28, 2015, Beijing, P.R. China (9 pages).

(Continued)

*Primary Examiner* — Brian S Roberts
(74) *Attorney, Agent, or Firm* — Foley & Lardner LLP

(57) ABSTRACT

A wireless communication method for use in a first wireless terminal is disclosed. The wireless communication method comprises transmitting, to a first wireless network node, assistance information related to a second wireless terminal, and receiving, from the first wireless network node, a configuration message of configuring the first wireless terminal to forward data traffic for the second wireless terminal.

18 Claims, 12 Drawing Sheets

(56) References Cited

FOREIGN PATENT DOCUMENTS

| CN | 110830953 A | 2/2020 |
|---|---|---|
| CN | 111034075 A | 4/2020 |
| JP | 2020-074650 A | 5/2020 |
| WO | WO-2018/028694 A1 | 2/2018 |
| WO | WO-2018/230027 A1 | 12/2018 |
| WO | WO-2020/091443 A1 | 5/2020 |

OTHER PUBLICATIONS

International Search Report and Written Opinion for PCT Appl. No. PCT/CN2020/090642, mailed Feb. 18, 2021 (8 pages).
Ericsson, "SL handling during handover in NR", 3GPP TSG-RAN WG2 #107bis, R2-1913319, Oct. 18, 2019, Chongqing, China (8 pages).
Notice of Grounds of Rejection for JP Appl. No. 2022-569229, dated Feb. 6, 2024 (with English translation, 7 pages).
ZTE, et al., "Consideration on NR V2X mode 1 resource allocation", 3GPP TSG RAN WG2 Meeting #105, R2-1900380, Mar. 1, 2019, Athens, Greece (5 pages).
Extended European Search Report on EP Appl. No. 20896633.3, dated Sep. 13, 2023 (13 pages).
First Office Action for CN Appl. No. 202080102037.9, dated Aug. 2, 2025 (with English translation 28 pages).

\* cited by examiner

METHOD FOR SIDELINK RELAY COMMUNICATION UNDER DUAL CONNECTIVITY

CROSS-REFERENCE TO RELATED APPLICATION

This application claims the benefit of priority under 35 U.S.C. § 120 as a continuation of PCT Patent Application No. PCT/CN2020/090642, filed on May 15, 2020, the disclosure of which is incorporated herein by reference in its entirety.

TECHNICAL FIELD

This document is directed generally to wireless communications, and more particularly to new radio (NR) wireless communications.

BACKGROUND

With the development of wireless multimedia services, demands of high data rate services significantly increase. Under such a condition, requirements of system capacity and coverage of conventional cellular network become higher. On the other hand, due to application scenarios of public safety, social network, short distance data sharing, local advertisement, . . . , etc., demands of proximity services which allow people to acknowledge or to communicate with adjacent people or objects also increase. However, the conventional cellular network has obvious limitations with regarding to supporting the high data rate services and the proximity services. As a result, device-to-device (D2D) communication technology is proposed to serve such demands. By adopting the D2D technology, burden of the cellular network can be decreased, power consumption of user equipment can be reduced, data rate can be increased and robustness of network infrastructures can be improved, so as to fulfill the demands of the high data rate services and the proximity services. The D2D technology is also called the proximity service (ProSe) or sidelink communications and an interface between equipment is known as PC5 interface.

SUMMARY

For supporting applications and services with broader ranges, a sidelink based relay communication is proposed to extend the coverage and to improve power consumption of the network. For example, the sidelink based relay communication may be applied to indoor relay communication, smart farming, smart factory and public safety services. FIG. 1 shows scenarios of applying the sidelink based relay communication which comprise:

1) UE-to-Network relay (Mode 1 shown in FIG. 1): Relay communications of the mode 1 are designed for user equipment (UE) (e.g. UE1 shown in FIG. 1) in a area with weak or no coverage. Under such a condition, the UE1 is allowed to communicate with network (e.g. base station (BS) shown in FIG. 1) via a nearby UE2 covered by the network. As a result, the coverage of the network is extended and the capacity of the network is enlarged. Note that in this scenario the UE2 is called UE-to-Network relay and the UE1 is called remote UE.

2) UE-to-UE relay (Mode 2 shown in FIG. 1): During emergency situations (e.g. earthquake), the cellular network may operate abnormally or a sidelink communication range of the network needs to be extended. Thus, the relay communications are designed for allowing the UEs having communication with each other via the relay UE. As shown in FIG. 1, UE3 communicates with UE4 via UE5 (or multiple relay UEs (not shown in FIG. 1)), wherein UE5 is called UE-to-UE relay in this scenario.

Note that an interface between UE and BS is called Uu interface.

In long-term-evolution, LTE, two technical schemes (i.e. internet protocol (IP) layer (Layer 3) based and access layer (Layer 2) based) are provided for the UE-to-Network relay communications. The layer 3 based relay forwards data according to IP information (e.g. IP address or IP port number) of the UE. The layer 2 based relay routes and forwards data of user plane and control plane in access layer, allowing network operator (i.e. core network and/or the BS) to manage the remote UE more effectively. Because mechanisms of NR sidelink communications are much different from those of LTE sidelink communications (e.g. at frame structure, quality-of-service (QoS) processing, bearer configurations, bearer establishments, and so on). The technical schemes of sidelink proposed in LTE may not apply to the NR system.

This document relates to methods, systems, and devices for sidelink relay communication under dual connectivity, and more particularly to methods, systems, and devices for allowing a remote UE to connect to network via a layer 2 relay UE which is in dual connectivity and to perform data transmissions through the layer 2 relay UE.

The present disclosure relates to a wireless communication method for use in a first wireless terminal. The wireless communication method comprises:

transmitting, to a first wireless network node, assistance information related to a second wireless terminal, and receiving, from the first wireless network node, a configuration message of configuring the first wireless terminal to forward data traffic for the second wireless terminal.

Various embodiments may preferably implement the following features:

Preferably, the first wireless terminal is in multi-radio dual connectivity with the first wireless terminal and a second wireless terminal, wherein the configuration message comprises at least one of: a connection indication indicating that the second wireless terminal is connected to the first wireless network node or the second wireless network node, a path indication indicating a path of forwarding the data traffic to the second wireless network node, a master cell group, MCG, backhaul bearer configuration, or a secondary cell group, SCG, backhaul bearer configuration.

Preferably, the assistance information includes a Uu radio access technology, RAT, of the second wireless terminal.

Preferably, the wireless communication method further comprises receiving, from the second wireless terminal, RAT information including a Uu RAT of the second wireless terminal.

Preferably, the RAT information is received in one of a PC5-S signaling, a PC5 radio resource control, RRC, signaling or an adaptation header of an adaptation packet data unit containing a connection request message.

Preferably, the wireless communication method further comprises transmitting, to the second wireless terminal, dual connectivity information related to a dual connectivity of the first wireless terminal.

Preferably, the dual connectivity information comprises at least one of a RAT of the first wireless network node, a RAT of the second wireless network node, a dual connectivity indication, at least one cell global identifier of at least one serving cell or a multi-Radio dual connectivity, MR-DC, type.

The present disclosure relates to a wireless communication method for use in a first wireless network node. The wireless communication method comprises:
  transmitting a secondary node request to a second wireless network node which connects to a first wireless terminal connecting the first wireless network node, and
  receiving, from the second wireless network node, a secondary node bearer configuration of configuring the first wireless terminal to forward data traffic for a second wireless terminal.

Various embodiments may preferably implement the following features:

Preferably, the secondary node request comprises at least one of a list of requested secondary cell group, SCG, backhaul bearer, an SCG backhaul bearer indication, a relaying backhaul bearer indication, a radio bearer type indication, a Uu RB identifier, ID, a Uu RB priority, or a layer 2 ID of the second wireless terminal.

Preferably, the secondary node bearer configuration comprises at least one of: an SCG backhaul bearer ID, a Uu RB ID allowed to map to the SCG backhaul bearer, a Uu RB priority allowed to map to the SCG backhaul bearer, an SCG backhaul bearer priority, a logical channel ID, a radio-link-control sequence number, RLC SN, length, or the maximum number of retransmissions.

Preferably, the wireless communication method further comprises transmitting, to the second wireless network node, a radio resource control, RRC, transfer message between the first wireless network node and the second wireless network node, wherein the RRC transfer message comprising at least one of: a layer 2 ID of the second wireless terminal, a Uu signaling radio bearer, SRB, ID of the second wireless terminal, or an RRC container of encapsulating at least one control message of the second wireless terminal.

Preferably, the RRC transfer message is transmitted via first wireless terminal associated signaling.

Preferably, the secondary node request and the secondary node bearer configuration are transmitted via first wireless terminal associated signaling.

Preferably, the wireless communication method further comprises receiving, from the first wireless terminal, assistance information related to the second wireless terminal, wherein the assistance information includes a Uu RAT of the second wireless terminal.

Preferably, the wireless communication method further comprises transmitting, to the first wireless terminal, a configuration message of configuring the first wireless terminal to forward the data traffic for the second terminal.

Preferably, the configuration message comprises at least one of: a connection indication indicating that the second wireless terminal is connected to the first wireless network node or the second wireless network node, a path indication indicating a path of forwarding the data traffic, a master cell group, MCG, backhaul bearer configuration, or an SCG backhaul bearer configuration.

Preferably, the configuration of the MCG or SCG backhaul bearer comprises at least one of: a cell group ID, a backhaul bearer indication, a backhaul bearer ID, a Uu RB ID allowed to map to the backhaul bearer, a Uu RB priority allowed to map to the backhaul bearer, a backhaul bearer priority, a backhaul logical channel ID, or a radio-link-control, RLC, configuration.

The present disclosure relates to a wireless communication method for use in a second wireless network node. The wireless communication method comprises:
  receiving a secondary node request from a first wireless network node which connects to a first wireless terminal connecting the second wireless network node, and
  transmitting, to the first wireless network node, a secondary node bearer configuration of configuring the first wireless terminal to forward data traffic for a second wireless terminal.

Various embodiments may preferably implement the following features:

Preferably, the secondary node request comprises at least one of a list of requested secondary cell group, SCG, backhaul bearer, an SCG backhaul bearer indication, a relaying backhaul bearer indication, a radio bearer type indication, a Uu RB identifier, ID, a Uu RB priority, or a layer 2 ID of the first wireless terminal.

Preferably, the secondary node bearer configuration comprises at least one of:
  an SCG backhaul bearer ID, a Uu RB ID allowed to map to the SCG backhaul bearer, a Uu RB priority allowed to map to the SCG backhaul bearer, an SCG backhaul bearer priority, a logical channel ID, a radio-link-control sequence number, RLC SN, length, or the maximum number of retransmissions.

Preferably, the wireless communication method further comprises transmitting, to the second wireless network node, a radio resource control, RRC, transfer message between the first wireless network node and the second wireless network node,
  wherein the RRC transfer message comprises at least one of a layer 2 ID of the second wireless terminal, a Uu signaling resource bearer, SRB, ID of the second wireless terminal, or an RRC container of encapsulating at least one control message of the second wireless terminal.

Preferably, the RRC transfer message is transmitted via first wireless terminal associated signaling.

Preferably, the secondary node request and the secondary node bearer configuration are transmitted via first wireless terminal associated signaling.

The present disclosure relates to a wireless communication method for use in a third wireless network node. The wireless communication method comprises:
  transmitting, to a fourth wireless network node, a configuration related to a third wireless terminal connecting to the third wireless network node via a fourth wireless terminal, and
  receiving, from the fourth wireless network node, a response message.

Various embodiments may preferably implement the following features:

Preferably, the fourth wireless terminal is in multi-radio dual connectivity with the third wireless network node and the fourth wireless network node and the configuration and the response message are transmitted via fourth wireless terminal associated signaling.

Preferably, the configuration comprises at least one of:
  a layer 2 identifier, ID, of the third wireless terminal, a mapping between Uu data radio bearer, DRB, of the third wireless terminal and PC5 backhaul bearer, a configuration of the Uu DRB of the third wireless terminal, a mapping between the Uu DRB of the third wireless terminal and the relaying backhaul bearer which is used by the fourth wireless terminal for relaying data between the third wireless terminal and the third wireless network node, a configuration of the relaying backhaul bearer, or a mapping between the PC5 backhaul bearer and the relaying backhaul bearer.

Preferably, the configuration of the relaying backhaul bearer comprises at least one of bearer ID, bearer quality-of-service, QoS, bearer type, uplink configuration, transport network layer, TNL, information of the third wireless network node, PC5 backhaul bearer mapped to the relaying backhaul bearer, Uu DRB mapped to the relaying backhaul bearer, or required sidelink DRB IDs.

Preferably, the response message comprises at least one of a list of SCG BH bearer accepted to configure, a list of SCG BH bearer failed to configure, or failure cause.

The present disclosure relates to a wireless communication method for use in a fourth wireless network node. The wireless communication method comprises:
  receiving, from a third wireless network node, a configuration related to a third wireless terminal connecting to the third wireless network node via a fourth wireless terminal, and
  transmitting, to the third wireless network node, a response message.

Various embodiments may preferably implement the following features:

Preferably, the fourth wireless terminal is in multi-radio dual connectivity with the third wireless network node and the fourth wireless network node, and the configuration and the response message are transmitted via fourth wireless terminal associated signaling.

Preferably, the configuration comprises at least one of a layer 2 identifier, ID, of the third wireless terminal, a mapping between Uu data radio bearer, DRB, of the third wireless terminal and PC5 backhaul bearer, a configuration of the Uu DRB, a mapping between the Uu DRB of the third wireless terminal and the relaying backhaul bearer which is used by the fourth wireless terminal for relaying data between the third wireless terminal and the third wireless network node, a configuration of the relaying backhaul bearer, or a mapping between the PC5 backhaul bearer and the relaying backhaul bearer.

Preferably, the configuration of the relaying backhaul bearer comprises at least one of bearer ID, bearer quality-of-service, QoS, bearer type, uplink configuration, transport network layer, TNL, information of the third wireless network node, the mapping between the PC5 backhaul bearer and the relaying backhaul bearer, the mapping between the Uu DRB and the relaying backhaul bearer, or required sidelink DRB IDs.

Preferably, the response message comprises at least one of a list of SCG BH bearer accepted to configure, a list of SCG BH bearer failed to configure, or failure cause.

The present disclosure relates to a wireless communication method for use in a fifth wireless network node. The wireless communication method comprises:
  transmitting, to a sixth wireless network node, a secondary node addition request message for a fifth wireless terminal,
  wherein the secondary node addition request message comprises at least one of a remote wireless terminal indication, a layer 2 identifier of the fifth wireless terminal, information of a sixth wireless terminal which is used by the fifth wireless terminal to connect to the fifth wireless network node, or a mapping between Uu DRB of the fifth wireless terminal and relaying backhaul bearer of the sixth wireless terminal.

Various embodiments may preferably implement the following features:

Preferably, the wireless communication method further comprises:
  transmitting, to the sixth wireless network node, a relaying related information for configuring a relaying backhaul bearer which is used by the sixth wireless terminal for forwarding data of the fifth wireless terminal, and
  receiving, from the sixth wireless network node, a response message,
  wherein, the relaying related information and the response message are transmitted via sixth wireless terminal associated signaling.

Preferably, the relaying related information comprises at least one of: relay UE type indication, L2 ID of the sixth wireless terminal, a list of served remote UE, the mapping between Uu DRBs of the fifth wireless terminal and relaying BH bearers, relaying backhaul bearer configuration involving the sixth wireless network node.

Preferably, the response message comprises at least one of bearer ID, bearer QoS, bearer type, uplink configuration, transport network layer, TNL, information, PC5 backhaul bearer mapped to the relaying backhaul bearer, Uu DRB mapped to the relaying backhaul bearer, an RRC container containing configurations associated to relaying backhaul bearers, or required sidelink DRB IDs.

Preferably, the wireless communication method further comprises:
  receiving, from the sixth wireless terminal, data of a Uu DRB of the fifth wireless terminal terminated at the sixth wireless network node via the relaying backhaul bearer of the sixth wireless terminal,
  mapping the data to a transport bearer associated to the Uu DRB of the fifth wireless terminal or the relaying backhaul bearer of the sixth wireless terminal, and
  transmitting, to the sixth wireless network node, the data via the transport bearer.

Preferably, the wireless communication method further comprises:
  receiving, from the sixth wireless network node, data of a Uu DRB of the fifth wireless terminal terminated at the fifth wireless network node via a transport bearer,
  wherein the transport bearer is associated to the Uu DRB of the fifth wireless terminal or the relaying backhaul bearer of the sixth wireless terminal.

The present disclosure relates to a first wireless terminal, comprising:
  a communication unit, configured to:
  transmit, to a first wireless network node, assistance information related to a second wireless terminal, and
  receive, from the first wireless network node, a configuration message of configuring the first wireless terminal to forward data traffic for the second wireless terminal.

Various embodiments may preferably implement the following feature:

Preferably, the first wireless terminal further comprises a processor configured to perform a wireless communication method of any of the foregoing described methods.

The present disclosure relates to a first wireless network node, comprising:
  a communication unit, configured to:
  transmit a secondary node request to a second wireless network node which connects to a first wireless terminal connecting the first wireless network node, and
  receive, from the second wireless network node, a secondary node bearer configuration of configuring the first wireless terminal to forward data traffic for a second wireless terminal.

Various embodiments may preferably implement the following feature:

Preferably, the first wireless network node further comprises a processor configured to perform a wireless communication method of any of the foregoing described methods.

The present disclosure relates to a second wireless network node, comprising:
a communication unit, configured to:
receive a secondary node request from a first wireless network node which connects to a first wireless terminal connecting the second wireless network node, and
transmit, to the first wireless network node, a secondary node bearer configuration of configuring the first wireless terminal to forward data traffic for a second wireless terminal.

Various embodiments may preferably implement the following feature:

Preferably, the second wireless network node further comprises a processor configured to perform a wireless communication method of any of the foregoing described methods.

The present disclosure relates to a third wireless network node, comprising:
a communication unit, configured to:
transmit, to a fourth wireless network node, a configuration related to a third wireless terminal connecting to the third wireless network node via a fourth wireless terminal, and
receive, from the fourth wireless network node, a response message.

Various embodiments may preferably implement the following feature:

Preferably, the third wireless network node further comprises a processor configured to perform a wireless communication method of any of the foregoing described methods.

The present disclosure relates to a fourth wireless network node, comprising:
a communication unit, configured to:
receiving, from a third wireless network node, a configuration related to a third wireless terminal connecting to the third wireless network node via a fourth wireless terminal, and
transmitting, to the third wireless network node, a response message.

Various embodiments may preferably implement the following feature:

Preferably, the fourth wireless network node further comprises a processor configured to perform a wireless communication method of any of the foregoing described methods.

The present disclosure relates to a fifth wireless network node, comprising:
a communication unit, configured to:
transmitting, to a sixth wireless network node, a secondary node addition request message for a fifth wireless terminal,
wherein the secondary node addition request message comprises at least one of a remote wireless terminal indication, a layer 2 identifier of the fifth wireless terminal, information of a sixth wireless terminal which is used by the fifth wireless terminal to connect to the fifth wireless network node, or a mapping between Uu DRB of the fifth wireless terminal and relaying backhaul bearer of the sixth wireless terminal.

Various embodiments may preferably implement the following feature:

Preferably, the fifth wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

Figure 1:
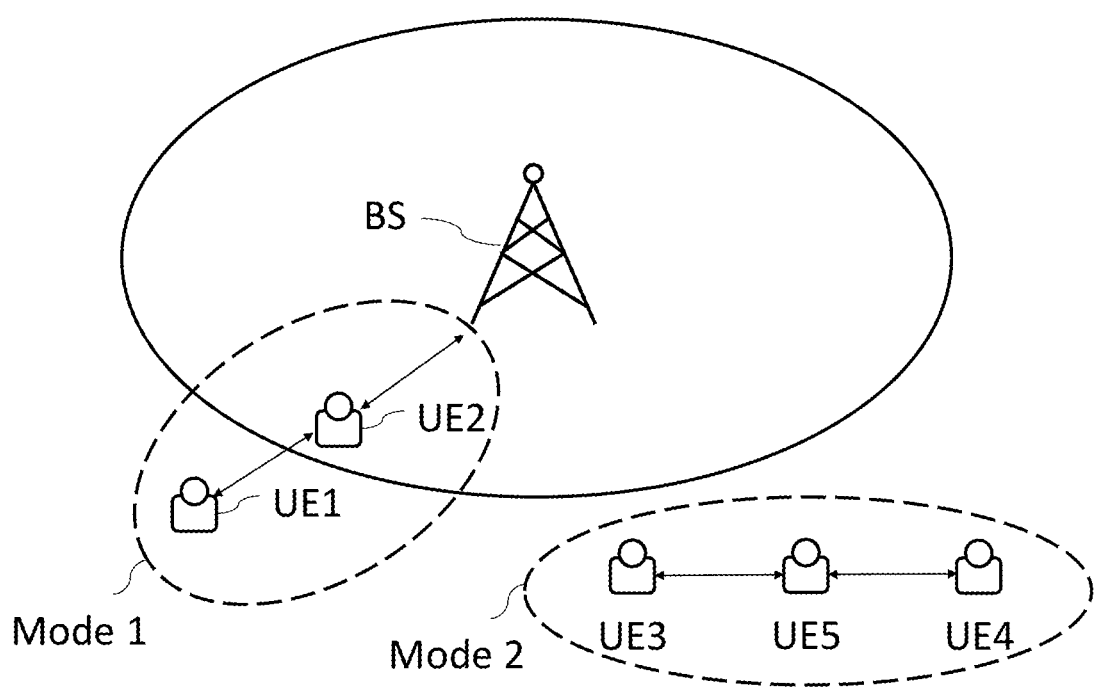
FIG. 1 shows a schematic diagram of sidelink relay communications.
Figure 2:
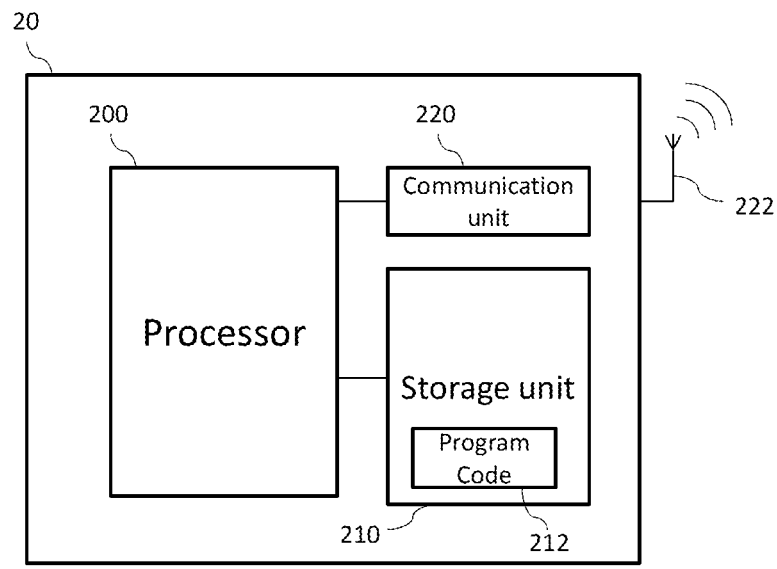
FIG. 2 shows an example of a schematic diagram of a wireless terminal according to an embodiment of the present disclosure.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
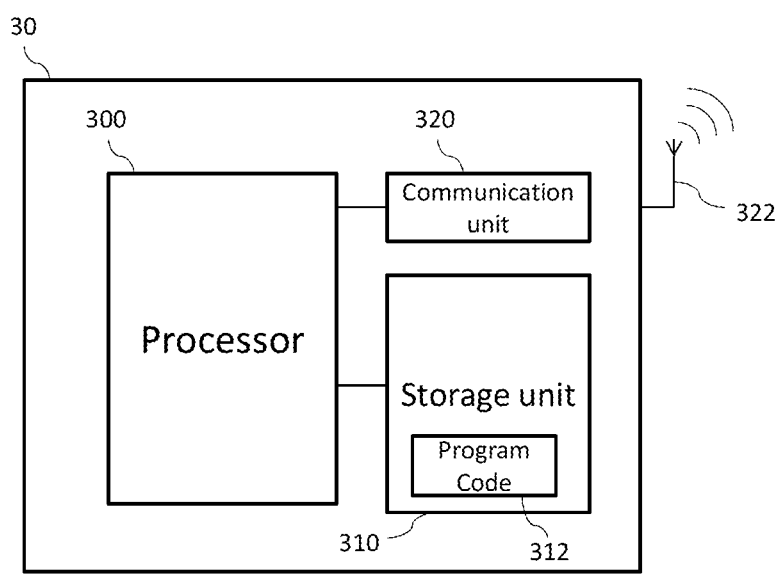
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In this disclosure, QoS represents quality of service.

In this disclosure, 5QI represents 5G QoS identifier.

In this disclosure, QFI represents QoS flow identifier.

In this disclosure, PFI represents PC5 QoS flow identifier.

In this disclosure, PQI represents PC5 5QI.

In this disclosure, BH represents backhaul.

In this disclosure, SL represents sidelink.

In this disclosure, DRB represents data radio bearer.

In this disclosure, SRB represents signaling radio bearer.

In an embodiment, a remote UE accesses to one of BSs (BS1 and BS2) via a relay UE. In an embodiment, the relay UE is in multi-radio dual connectivity (MR-DC) with the BS1 and the BS2, wherein the BS1 may be a master node (MN) and the BS2 may be a secondary node (SN) for the relay UE. In the following, embodiments are exemplified for illustrating how the remote UE connects to network (e.g. BS1 or BS2) via the relay UE which is in dual connectivity and how the remote UE performs data transmissions (e.g. transmitting control signalling/control plane data and/or data traffic(s)/user plane data) through the relay UE.

In an embodiment, on the Uu interface (i.e. interface between the relay UE and BS1/BS2), the relay UE may reports Uu radio access technology (RAT) of the remote UE to BS1 and receives RRC configuration indicating which path the relay UE shall use for forwarding the RRS messages of the remote UE and the associated backhaul (BH) bearer configuration from BS1.

In an embodiment, on the Xn interface (i.e. interface between BS1 and BS2), the BS1 and BS2 may negotiate a secondary cell group (SCG) BH bearer configuration and relay RRC transfer information.

In an embodiment, on the PC5 interface (i.e. interface between the remote UE and the relay UE), the relay UE may learn the Uu RAT of the remote UE.

In an embodiment, the remote UE connects to a single BS (e.g. one of BS1 and BS2) via the relay UE). In this embodiment, BS1 and BS2 negotiate relaying BH bearer used by the relay UE for relaying remote UE's traffic via relay UE associated Xn signaling.

In an embodiment, the when the remote UE is connected to BS1 (i.e. the MN of the relay UE) via the relay UE, BS1 configures the mapping between remote UE Uu data resource bearers (DRBs) and relaying BH bearers. When SCG relaying BH bearer is required, BS1 requests BS2 to configure the SCG relaying BH bearer and indicates the associated Xn transport bearer transport network layer (TNL) information.

In an embodiment, the when the remote UE is connected to BS2 (e.g. the SN of the relay UE) via the relay UE, BS2 configures the mapping between remote UE Uu DRBs and relaying BH bearers. When master cell group (MCG) relaying BH bearer is required, BS2 requests BS1 to configure the MCG relaying BH bearer and indicates the associated Xn transport bearer TNL information. As an alternative or in addition, BS2 informs the remote UE Uu DRB configuration to BS1 and BS1 configures the mapping between remote UE Uu DRBs and relaying BH bearers.

In an embodiment, the remote UE gets into MR-DC via the relay UE and the remote UE has the same MN (e.g. BS1) and SN (e.g. BS2) as the relay UE.

In this embodiment, the BS1 and BS2 negotiate remote UE Uu DRB via remote UE associated Xn signaling.

In an embodiment, the BS1 and BS2 negotiate relaying BH bearer (and optional mapping config) used by the relay UE via relay UE associated Xn signaling.

In an embodiment, the for SN terminated remote UE bearer, when receiving remote UE's data from relaying BH bearer, the MN maps the remote UE's data to the remote UE Uu DRB associated Xn transport bearer to transmit to SN, or maps to the relaying BH bearer associated Xn transport bearer to transmit to SN.

EMBODIMENT 1

The next generation radio access network (NG-RAN) supports the MR-DC, wherein multiple Rx/Tx capable UEs may be configured to utilize resources provided by two different network nodes (e.g. BSs) connected via non-ideal backhaul. In an embodiment, one network node may provide new radio (NR) access and another network node may provide either Evolved Universal Terrestrial Radio Access (E-UTRA) or NR access. In addition, one network node acts as the MN and another network node acts as the SN. The MN and SN are connected via a network interface (i.e. Xn interface) and at least the MN is connected to the core network.

Figure 4:
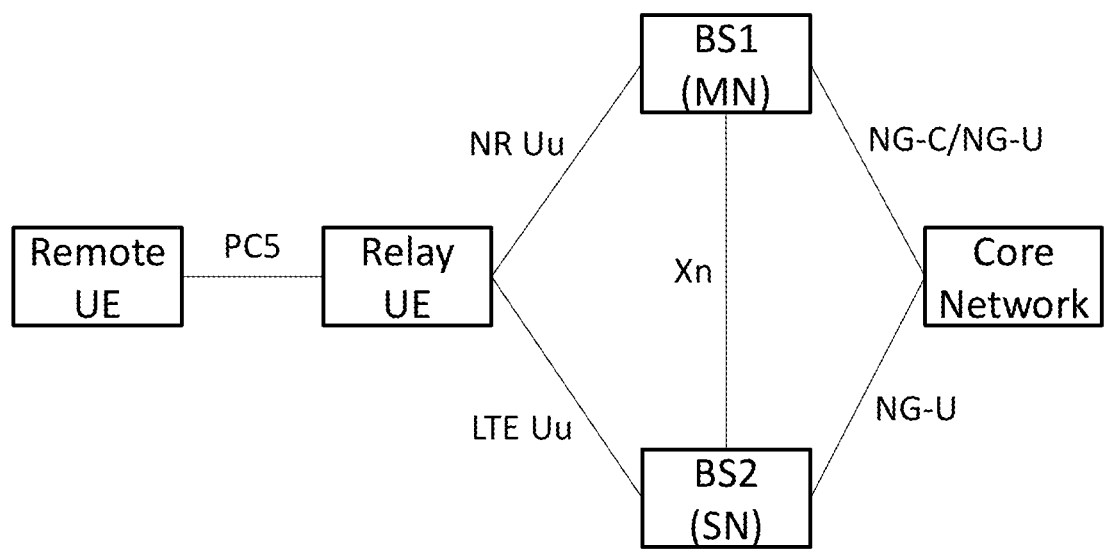
FIG. 4 shows a schematic diagram of a wireless communication system according to an embodiment of the present disclosure.

FIG. 4 shows a schematic diagram of a wireless communication system according to an embodiment of the present disclosure. In FIG. 4, the relay UE is in the MR-DC and connects to BSs BS1 and BS2, wherein the BS1 acts as the MN and BS2 acts as the SN. In this embodiment, the BS1 may be next-generation Node B (gNB) and the BS2 may be an evolved Node B (enB). The relay UE supports layer 2 based (L2-based) sidelink (SL) relay communications and a remote UE selects the relay UE to connect to network and to transmit/receive data (traffic) to/from the network via the relay UE.

Figure 5:
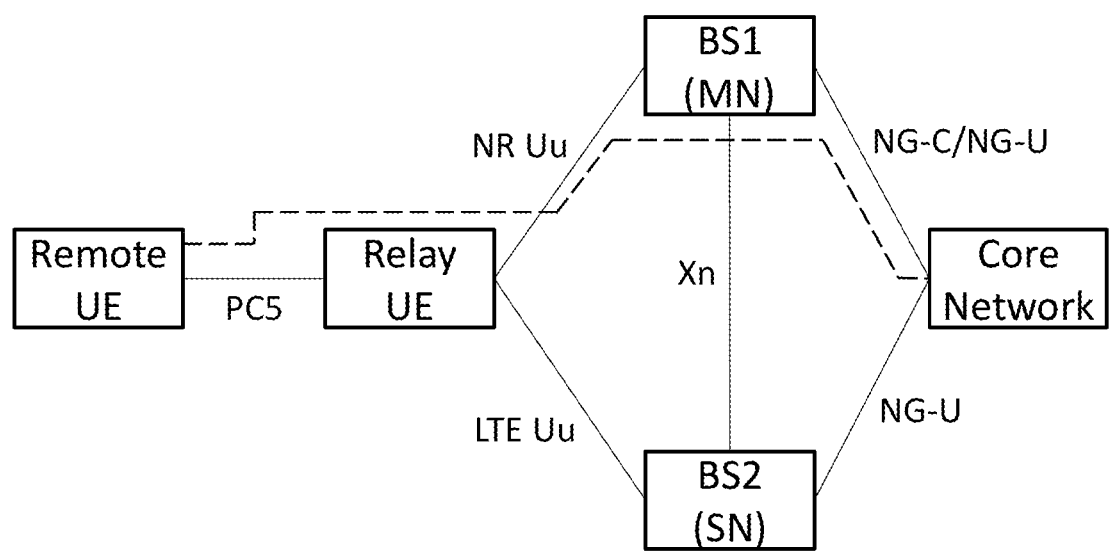
FIG. 5 shows a schematic diagram of a wireless communication system according to an embodiment of the present disclosure.

For the remote UE to get access to the network via the L2-based relay UE, following embodiments can be considered:

1. The remote UE gets access to the BS1 (e.g. establishes RRC connections with the BS1) via the relay UE:

FIG. 5 shows a schematic diagram of a wireless communication system according to an embodiment of the present disclosure. In FIG. 5, the remote UE may be aware of the MN RAT (i.e. NR RAT in FIG. 5) of the relay UE, determine whether it can support the MN RAT and generate RRC messages for the corresponding RAT. Specifically, the relay UE may send at least one of the following information to the remote UE: MN RAT (e.g. LTE RAT or NR RAT), SN RAT, relay dual connectivity indication, all serving cells including NCGIs/ECGIs (NR cell group identifiers/E-UTRAN cell group identifiers), MR-DC type (such as EN-DC (E-UTRAN NR-dual connectivity), NE-DC (NR E-UTRAN-dual connectivity), NGEN-DC (NG-RAN E-UTRA dual connectivity) or NR-DC (NR dual connectivity)). In an embodiment, the relay UE may carry the above information in a discovery announcement/additional/response message, the direct communication request/accept message, or PC5 RRC messages.

Figure 6:
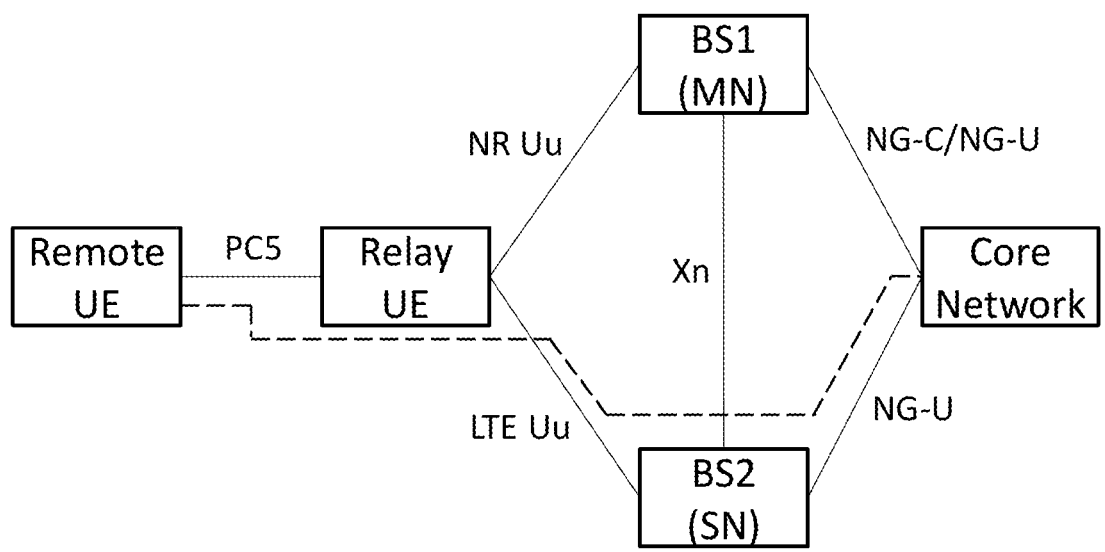
FIG. 6 shows a schematic diagram of a wireless communication system according to an embodiment of the present disclosure.

2. The remote UE gets access to the BS2 via the relay UE:

FIG. 6 shows a schematic diagram of a wireless communication system according to an embodiment of the present disclosure. In FIG. 6, the remote UE connects to the BS2 via the relay UE. In an embodiment, the BS2 serves the remote UE as a standalone BS. For example, the remote UE only supports LTE Uu, the MN (i.e. BS1) of the relay UE is NR BS and the SN (i.e. BS2) of the relay UE is LTE BS. Under such a condition, the remote UE can only get access to the LTE BS (i.e. BS2) via the relay UE.

In an embodiment, the relay UE learns the Uu RAT that the remote UE supports/currently uses/inclined to use and forwards the remote UE's RRC connection request to the BS of the same RAT.

More specifically, the remote UE may transmit RAT information including the Uu RAT of the remote UE by the following ways: (Note that NR PC5 may be used between the remote UE and the relay UE)

A) The remote UE may transmit the RAT information to the relay UE through the PC5-S signaling (such as direct communication request/accept, L2 unicast link establishment messages, discovery related messages) or PC5-RRC signaling (such as UE capability exchanging messages). In an embodiment, the RAT information indicates (e.g. includes) the relay UE that the Uu RAT which the remote UE supports/currently uses/inclined to use;

B) The adapt header of the introduced PC5 adaptation layer carries the RAT information related to the remote UE. In an embodiment, the RAT information indicates the Uu RAT of the remote UE. Specifically, the remote UE generates a Uu RRC connection request message and submits the Uu RRC connection request message to Packet Data Convergence Protocol (PDCP) layer. After PDCP handling, the handled packet is submitted to PC5 adaptation layer. The remote UE constructs the adapt packet data unit (PDU) with an adapt header including the Uu RAT of the RRC connection request message and submits the PDU to lower layers for transmission over the PC5 interface to the relay UE. That is, the RAT information is carried in the adaptation header of the adaptation PDU containing the RRC connection request message.

In an embodiment, after learning the Uu RAT of the remote UE (e.g. LTE RAT), the relay UE may forward the remote UE RRC connection request message to BS2 via a default SCG BH bearer (if the default SCG BH bearer is configured). In an embodiment, the relay UE may report assistance information related to the remote UE to its MN (i.e. BS1) through sidelink UE information message or other RRC messages. And the BS1 negotiates with the BS2 to decide which path the relay UE uses to forward the remote UE's RRC connection request message to the BS2. The assistance information may include the Uu RAT of the remote UE. The relay UE can learn the Uu RAT of the remote UE via PC5 interface as presented in above embodiments.

Figure 7:
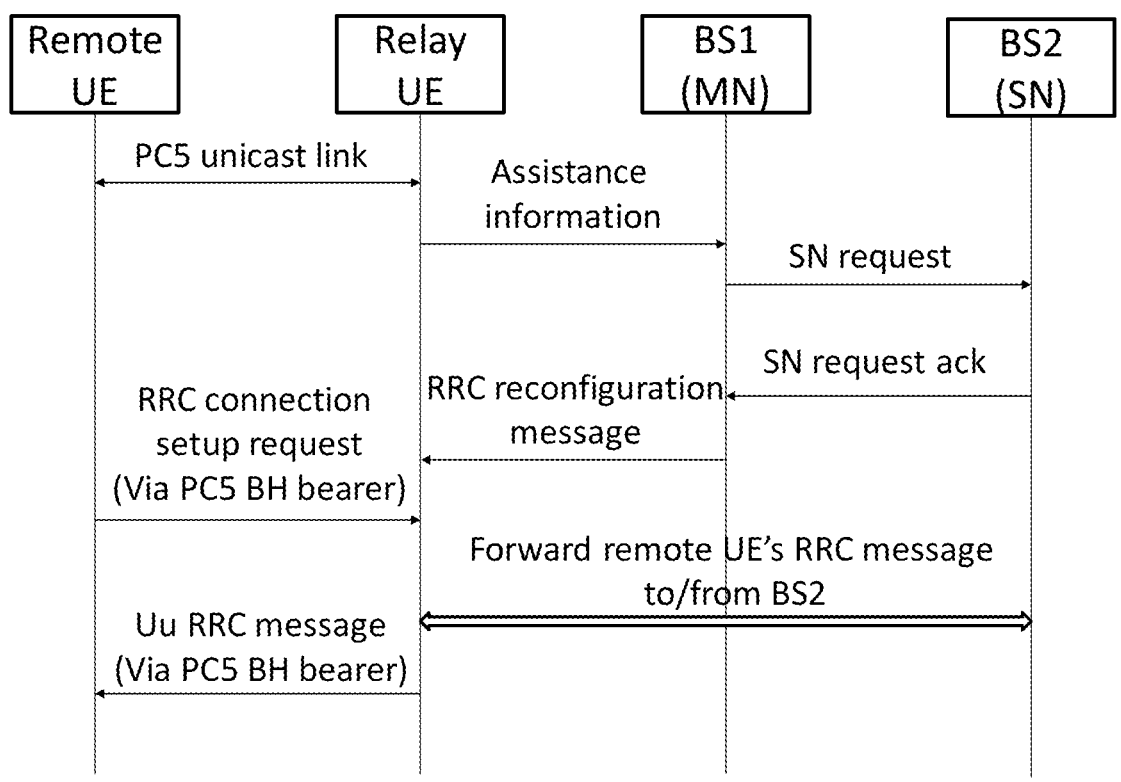
FIG. 7 shows a schematic diagram of a process according to an embodiment of the present disclosure.

In an embodiment, a direct SCG path is decided to be used by the relay UE. FIG. 7 shows a schematic diagram of a process according to an embodiment of the present disclosure. In FIG. 7, the relay UE forwards the remote UE RRC messages via the direct SCG path (i.e. the path direct to the BS2). In this embodiment, when the direct SCG path is decided to be used, the BS1 requests the BS2 to configure a SCG BH bearer for the relay UE for forwarding remote UE RRC messages (i.e. the RRC messages of the remote UE).

Specifically, the BS1 sends an SN request (e.g. SCG BH bearer request) to the BS2. In an embodiment, the SN request may include at least one of a list of requested SCG BH bearer, an SCG BH bearer indication, a relaying bearer indication: indicating the requested bearer is used for forwarding/relaying remote UEs' traffic), a radio bearer type indication (e.g. signalling radio bearer or data radio bearer): indicating the requested bearer is used for forwarding remote UEs' Uu SRB or DRB packets, a Uu RB ID: indicating the requested bearer is used for forwarding Uu RB ID's packets of remote UE, a Uu RB priority: indicating the requested bearer is used for forwarding packets of which bearer priority of remote UE, or a L2 ID of the remote UE.

In an embodiment, the SCG BH bearer has no associated PDU session and NG tunnel. In this embodiment, the SCG BH bearer request information may be transmitted through an SN modification request message or other Xn messages. In this embodiment, the BH bearer (also called radio link control (RLC) bearer, RLC channel) has only associated RLC entity, logical channel, some MAC configuration and optional adaptation entity (e.g. no PDCP entity or SDAP entity compared to normal radio bearer).

Next, the BS2 may return a response message (e.g. SN request acknowledge (Ack)), which may include at least one of a list of SCG BH bearer accepted to configure, a list of SCG BH bearer failed to configure, or failure cause.

In an embodiment, each SCG BH bearer accepted to configure (can be also called as SN bearer configuration) may further include at least one of a cell group ID, a BH bearer indication, a Uu RB ID allowed to map to the SCG backhaul bearer, a Uu RB priority allowed to map to the SCG backhaul bearer, an SCG backhaul bearer priority, a BH logical channel ID, or a radio-link-control, RLC, configuration.

In an embodiment, the response message may be transmitted through SN modification request ack, reject message or other Xn messages.

After receiving the response message from the BS2, the BS1 may send an RRC reconfiguration message including the list of SCG BH bearer accepted to configure (i.e. SN bearer configuration) received from the BS2 to the relay UE. The relay UE establishes an SCG BH bearer based on the SN bearer configuration and is able to use the established SCG BH bearer to forward remote UE RRC messages (e.g. RRC connection setup request) to BS2. The BS2 is also able to use the SCG BH bearer to send RRC messages for remote UE via the relay UE.

Figure 8:
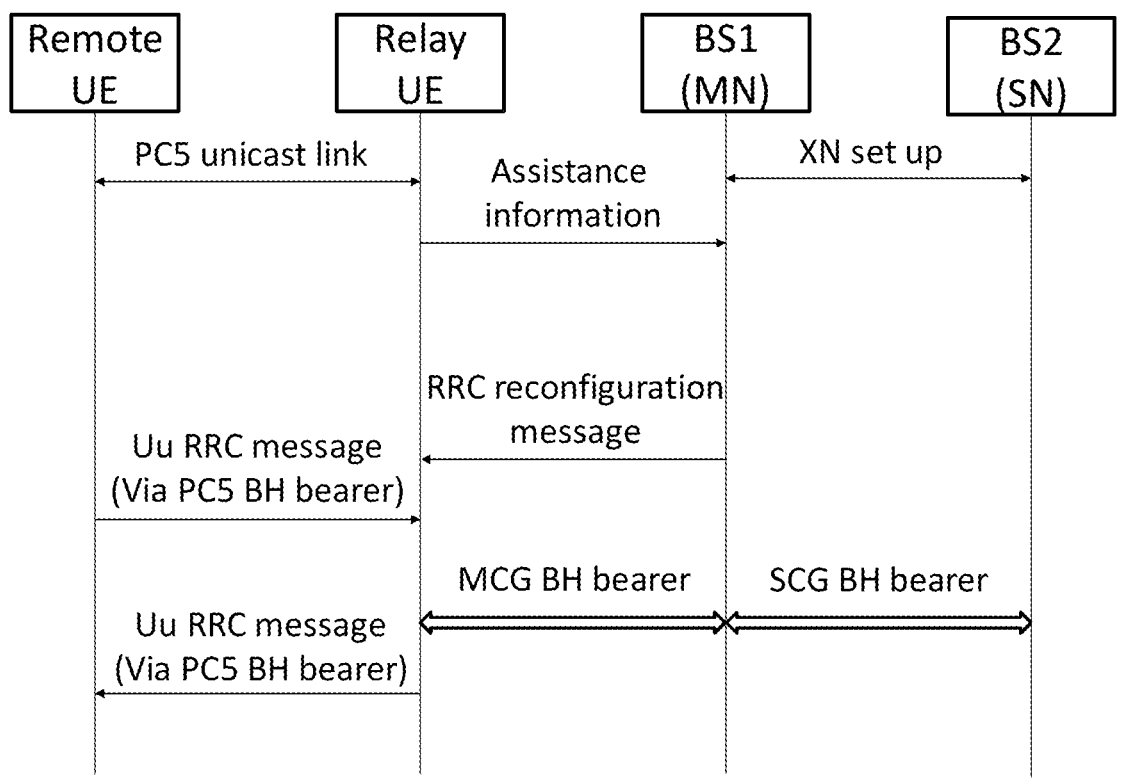
FIG. 8 shows a schematic diagram of a process according to an embodiment of the present disclosure.

In an embodiment, the indirect path (i.e. the path of forwarding through MN to SN) is determined to be used. FIG. 8 shows a schematic diagram of a process according to an embodiment of the present disclosure. In FIG. 8, the indirect path through the BS1 to the BS2 is determined to be used. Under such a condition, the BS1 configures the MCG BH bearer, wherein the MCG BH bearer has no associated PDU session and NG tunnel. The MCG BH bearer configuration may include at least one of a cell group ID (e.g. an MCG bearer ID), a Uu RB ID allowed to map to the MCG backhaul bearer, a Uu RB priority allowed to map to the MCG backhaul bearer, a backhaul bearer priority, a backhaul logical channel ID, or a radio-link-control (RLC) length.

In an embodiment, the BS1 sends the RRC reconfiguration message to the relay UE to indicate which path the relay UE shall use and the associated BH bearer configuration. Specifically, the RRC reconfiguration message may include at least one of: a connection indication indicating the remote UE is connected to the BS1 or the BS2, a path indication (direct path, indirect path, MCG BH bearer, SCG BH bearer), MCG BH bearer configuration or SCG BH bearer configuration.

In FIG. 8, after receiving the RRC reconfiguration message, the relay UE establishes a MCG BH bearer based on the configuration. Subsequently, the relay UE may use the established MCG BH bearer to forward remote UE RRC messages to the BS1 and the BS1 forwards the messages to the BS2 through the Xn interface RRC transfer/relaying RRC transfer message or other Xn messages. In the downlink direction, when generating an RRC message for the remote UE, BS2 sends the generated RRC message to the BS1 through the RRC transfer/relaying RRC transfer message and the BS1 forwards the generated RRC message to the remote UE via the relay UE. Specifically, the relaying RRC transfer message in both directions (from BS1 to BS2, or from BS2 to BS1) may include at least one of: a L2 ID of the remote UE, a SRB ID (e.g. Uu SRB ID of the remote UE), an RRC container (contains a PDCP-C PDU or Adapt PDU which encapsulate an RRC message of the remote UE).

In an embodiment, the relay UE may blindly forward the remote UE's RRC connection request message to its MN/BS1 or SN/BS2 via the default MCG BH bearer or default SCG BH bearer (if configured). For example, the relay UE forwards remote UE RRC message(s) via the default MCG BH bearer to the BS1. When the BS1 recognizes that the RAT of the remote UE RRC message is not the same as its own RAT but the same as the RAT of the BS2, the BS1 may forward the RRC message(s) of the remote UE to the BS2 through Xn interface RRC transfer/relaying RRC transfer message or other Xn messages. The BS2 parses the remote UE RRC message and serves the remote UE. The relaying RRC transfer information in both directions (from BS1 to BS2, or from BS2 to BS1) may include at least one of: remote UE L2 ID, SRB ID (Uu SRB ID of the remote UE), an RRC container (contains a PDCP-C PDU or Adapt PDU encapsulating an RRC message of the remote UE).

In an embodiment, the relay UE forwards the remote UE's RRC connection request message to both its MN/BS1 and SN/BS2 via default MCG BH bearer and default SCG BH bearer.

In this embodiment, when the BS1 determines that the Uu RAT of remote UE RRC message is different from its own RAT, the BS1 discards the RRC message of the remote UE. When the BS2 successfully parses the remote UE RRC message (i.e. Uu RAT of the remote UE RRC message is the same as that of the BS2), the BS2 serves the remote UE.

In an embodiment, after the remote UE successfully gets access to BS2 (e.g. the BS2 receives RRC connection setup complete message from remote UE), the BS2 informs the BS1 of the remote UE (such as L2 ID of the remote UE) via relay UE associated Xn signaling (e.g. SN modification required message or new defined Xn signaling used for carrying sidelink/relay related configuration).

EMBODIMENT 2

In this embodiment, the remote UE has setup RRC connection with the BS2 via the relay UE. In the following, how to forward data between the remote UE and BS2 via the relay UE (and optionally the BS1) is discussed.

Figure 9:
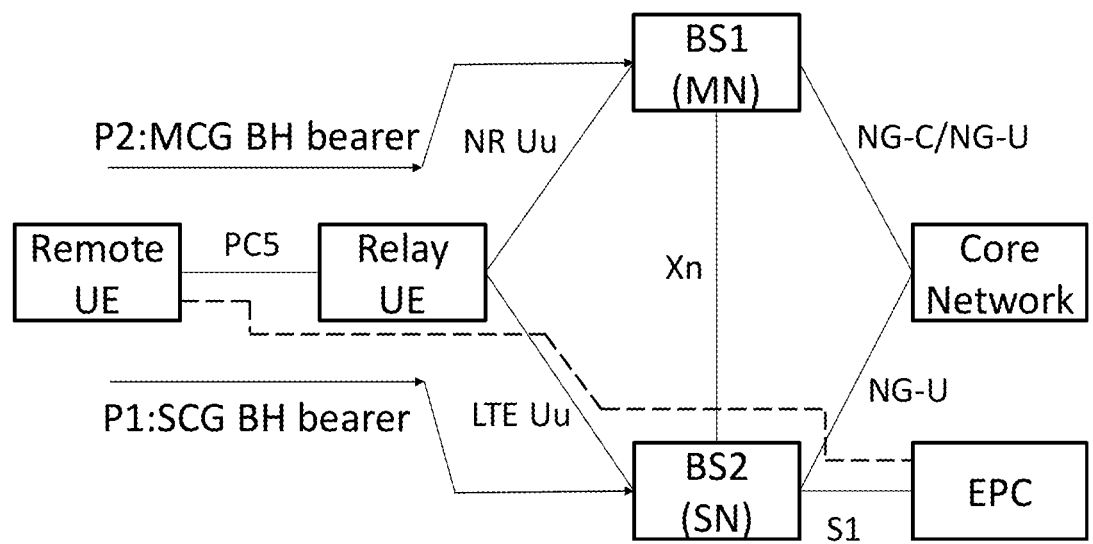
FIG. 9 shows a schematic diagram of a wireless communication system according to an embodiment of the present disclosure.

FIG. 9 shows a schematic diagram of a wireless communication system according to an embodiment of the present disclosure. In FIG. 9, the remote UE and the BS2 maintain the end-to-end PDCP. That is, PDCP entities corresponding to the remote UE are terminated at the BS2. Similar to relay UE own traffic, the relay UE may forward remote UE's traffic through SCG BH bearer (i.e. path P1, MCG BH bearer (SN terminated) (i.e. path P2) or split BH bearer (SN terminated) (path is not shown on FIG. 9) to the BS2. The SCG BH bearer, the MCG BH bearer (SN terminated) and the split BH bearer (SN terminated) are also called relaying BH bearers. In an embodiment, the relaying BH bearers are (also called relaying RLC bearer) have only associated RLC entity, logical channel, some MAC configuration and optional adaptation entity (no PDCP entity or SDAP entity compared to normal radio bearer).

In an embodiment, the BS2 configures Uu DRB and the mapping of Uu DRB and PC5 BH bearer for the remote UE. Since remote UE's traffic is forwarded by the relay UE which is in MR-DC, the BS2 informs the BS1 of the remote UE related configuration via relay UE associated Xn signaling, to determine the path/BH bearers used by the relay UE for relaying remote UE's traffic. Specifically, the remote UE related configuration may include at least one of: L2 ID of the remote UE, the mapping between Uu DRB (remote UE's) and PC5 BH bearer, Uu DRB configuration, the mapping between Uu DRB (remote UE's) and relaying BH bearer, relaying BH bearer configuration, the mapping between PC5 BH bearer and relaying BH bearer.

In an embodiment, the mapping between Uu DRB and PC5 BH bearer may include at least one of: Uu DRB ID(s) mapped to a PC5 BH bearer, priority(-ies) of Uu DRB mapped to priority(ies) of PC5 BH bearer, priority(-ies) of Uu DRB logical channel mapped to priority(ies) of PC5 BH bearer logical channel, 5QI/QFI mapped to a PC5 BH bearer, 5QI/QFI mapped to PQI/PFI, QCI mapped to a PC5 BH bearer.

In an embodiment, the Uu DRB configuration may include at least one of: DRB ID or DRB QoS.

In an embodiment, the relaying BH bearer configuration may include at least one of: bearer ID, bearer QoS, bearer type (SCG BH bearer, SN terminated MCG BH bearer or SN terminated split BH bearer), UL configuration (indicates UL usage at SN/BS2), SN TNL info (SN node endpoint(s) of the relaying BH bearer's Xn transport bearer), PC5 BH bearer mapped to the relaying BH bearer (e.g. the mapping between PC5 BH bearer and relaying BH bearer), Uu DRB mapped to the relaying BH bearer (e.g. the mapping between Uu DRB and relaying BH bearer), SN to MN container containing RLC/LCH/MAC configuration associated to relaying BH bearers, required SL DRB IDs.

In an embodiment, the mapping between PC5 BH bearer and relaying BH bearer may include at least one of: PC5 BH bearer ID(s) mapped to a relaying BH bearer, priority(ies) of PC5 BH bearer mapped to priority(ies) of relaying BH bearer, priority(ies) of PC5 BH bearer logical channel mapped to priority(ies) of relaying BH bearer logical channel, PQI/PFI mapped to a relaying BH bearer, PQI/PFI mapped to 5QI or QCI.

In an embodiment, the mapping between Uu DRB and relaying BH bearer may include at least one of: Uu DRB ID(s) priorities mapped to a relaying BH bearer, Uu DRB priority (e.g. QCI or 5QI) mapped to a relaying BH bearer, priority(ies) of Uu DRB mapped to priority(ies) of relaying BH bearer, priority(ies) of PC5 BH bearer logical channel mapped to priority(ies) of relaying BH bearer logical channel, QCI mapping, 5QI mapping, QCI mapped to 5QI, 5QI mapped to QCI.

In an embodiment, the remote UE related configuration may be transmitted through relay UE associated SN modification required message or new defined Xn signaling used for carrying sidelink/relay related configuration.

In an embodiment, after receives the remote UE related configuration, the BS1 sends a response message to the BS2 if relay UE is able to apply all the configured relaying BH bearers. Specifically, the response message may include at least one of: the list of relaying BH bearers admitted and/or not admitted to be setup, each relaying BH bearer admitted to be setup may further include at least one of: bearer ID, MN TNL info (MN node endpoint(s) of the relaying BH bearer's Xn transport bearer), LCID (LCID for primary path if split or duplication is applied). The response message may be transmitted through relay UE associated SN modification confirm message or new defined Xn signaling used for carrying sidelink/relay related configuration.

In an embodiment, the BS2 may inform only the remote UE's Uu DRB configuration (e.g. DRB QoS) to the BS1 and the BS1 determines the path/relaying BH bearers used by the relay UE for relaying remote UE's traffic. That is, the BS1 determines relaying BH bearer configuration and the mapping between (remote UE's) Uu DRB and relaying BH bearer and sends them to the BS2. In this embodiment, the interaction information between the BS1 and BS2 is carried through relay UE associated Xn signaling.

EMBODIMENT 3

Figure 10:
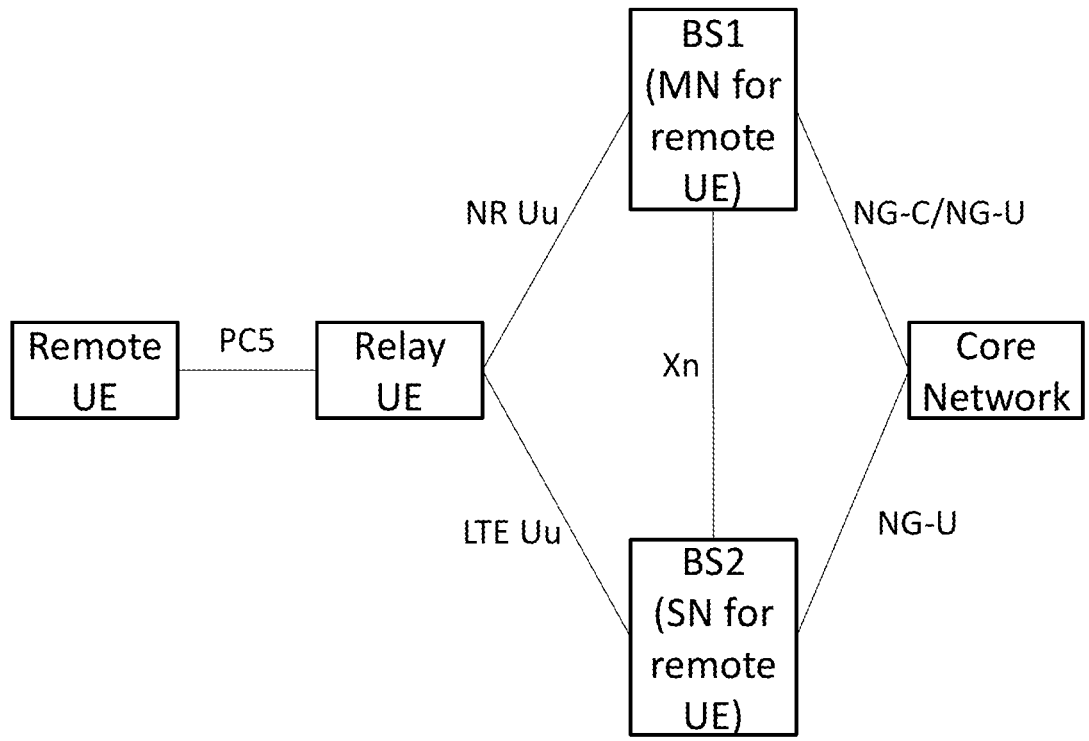
FIG. 10 shows a schematic diagram of a wireless communication system according to an embodiment of the present disclosure.

FIG. 10 shows a schematic diagram of a wireless communication system according to an embodiment of the present disclosure. In FIG. 10, the remote UE gets access to the BS1 via the relay UE and the BS1 adds the BS2 as an SN for the remote UE. That is, the remote UE gets into the MR-DC via the relay UE and has the same MN (BS1) and SN (BS2) as the relay UE.

In an embodiment, independent MR-DC operations for the remote UE are managed between the BS1 and the BS2. In other words, dedicated remote UE associated Xn signalling procedures are maintained. As a result, the remote UE can be configured with both MN terminated and SN terminated remote UE bearers. In addition, the MN/SN also can send data of MN/SN terminated remote UE bearers directly to the core network.

In an embodiment, the BS1 initiates an SN addition procedure for the remote UE as normal UE with the following modification. The BS1 sends an SN addition request message to the BS2 and the SN addition request message may further include at least one of: remote UE indication (indicate the UE is a remote UE), remote UE L2 ID, associated relay UE info, the mapping between remote UE Uu DRBs and relaying BH bearers (of relay UE).

In an embodiment, for SN terminated remote UE bearers involving MN or MN terminated remote UE bearers involving SN, the corresponding Xn transport bearers are setup. When receiving remote UE's traffic via relay UE's relaying BH bearer, the BS1/MN identifies the remote UE's Uu bearer, maps the remote UE's traffic to remote UE Uu bearer associated Xn transport bearer and transmits the Xn transport bearer to the BS2/SN.

In an embodiment, for SN terminated remote UE bearers involving MN or MN terminated remote UE bearers involving SN, the remote UE associated Xn transport bearers are not setup. When receiving remote UE's traffic via relay UE's relaying BH bearer, the BS1/MN maps the traffic to the relaying BH bearer associated Xn transport bearer and transmits the Xn transport bearer to the BS2/SN.

In an embodiment, the associated relay UE information may include at least one of: relay UE L2 ID, relay UE XnAP ID at MN, relay UE XnAP ID at SN. The mapping between remote UE Uu DRBs and relaying BH bearers may include at least one of: bearer ID/priority/bearer type/QCI/5QI of the relaying BH bearer mapped to a Uu DRB, Uu DRB ID(s) mapped to a relaying BH bearer ID(s), Uu DRB ID(s) priorities mapped to a relaying BH bearer, Uu DRB priority (e.g. QCI or 5QI) mapped to a relaying BH bearer, priority(ies) of Uu DRB mapped to priority(ies) of relaying BH bearer, priority(ies) of PC5 BH bearer logical channel mapped to priority(ies) of relaying BH bearer logical channel, QCI mapping, 5QI mapping, bearer type mapping (e.g. remote UE MCG bearer mapped to MCG relaying BH bearer, remote UE SCG bearer mapped to SCG relaying BH bearer, remote UE MN terminated bearers mapped to MCG BH bearer, remote UE SN terminated bearers mapped to SCG BH bearer), bearer type (e.g. MCG BH bearer, SCG BH bearer, split BH bearer) of the mapped relaying BH bearer.

In an embodiment, since remote UE's traffic is forwarded by the relay UE, the BS1 may additionally negotiate the path/relaying BH bearers used by the relay UE for relaying remote UE's traffic with the BS2. Specifically, the BS1 may send relaying related information to the BS2 via relay UE associated Xn signaling (e.g. SN modification request).

In an embodiment, the relaying related information may include at least one of: relay UE type indication (indicate the UE is a relay UE), relay UE L2 ID, a list of served remote UE, the mapping between remote UE Uu DRBs and relaying BH bearers (of relay UE), relaying BH bearer configuration involving BS2. For each served remote UE, the relaying related information may further include at least of remote UE L2 ID, remote UE XnAP ID at MN, remote UE XnAP ID at SN. The relaying BH bearer configuration involving BS2 may include at least one of: BS1/MN TNL information (MN node endpoint(s) of an SN terminated MCG relaying BH bearer's Xn transport bearer), bearer QoS. The bearer QoS may further include at least one of: QCI, 5QI, remote UE QoS flows mapped to the relaying BH bearer.

In an embodiment, the BS2 sends the relaying BH bearer setup response information to the BS1 via relay UE associated Xn signaling (e.g. SN modification request acknowledge message or other messages). In this embodiment, the relaying BH bearer setup response information may include at least one of: bearer ID, bearer QoS, bearer type (SCG BH bearer, SN terminated MCG BH bearer or SN terminated split BH bearer), UL configuration (indicates UL usage at SN/BS2), SN TNL info (SN node endpoint(s) of the relaying BH bearer's Xn transport bearer), PC5 BH bearer mapped to the relaying BH bearer (e.g. the mapping between PC5 BH bearer and relaying BH bearer), Uu DRB mapped to the relaying BH bearer (e.g. the mapping between Uu DRB and relaying BH bearer), SN to MN container containing RLC/LCH/MAC configuration associated to relaying BH bearers, required SL DRB IDs.

In an embodiment, the BS2 may initiate the modification of relaying BH bearers used by the relay UE via relay UE associated Xn signaling (e.g. SN modification required/confirm messages).

Figure 11:
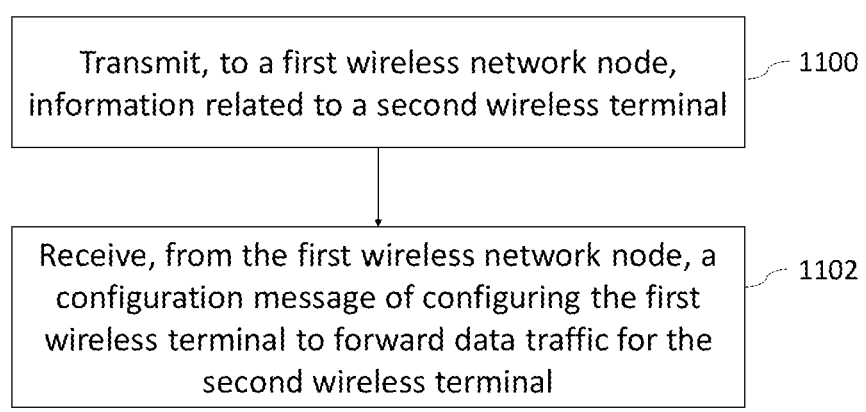
FIG. 11 shows a flowchart of a process according to an embodiment of the present disclosure.

FIG. 11 shows a flowchart of a process according to an embodiment of the present disclosure. The process shown in FIG. 11 may be utilized in a first wireless terminal (e.g. relay UE) and comprise the following steps:

Step 1100: Transmit, to a first wireless network node (e.g. BS1), assistance information related to a second wireless terminal (e.g. remote UE).

Step 1102: Receive, from the first wireless network node, a configuration message of configuring the first wireless terminal to forward data traffic for the second wireless terminal.

More specifically, the first wireless terminal may transmit the assistance information related to the second wireless terminal, to acquire a configuration message configuring the first wireless terminal to forward data traffic (e.g. control message or user plane data) for the second wireless terminal.

In an embodiment, the first wireless terminal is in multi-radio dual connectivity with the first wireless terminal and a second wireless terminal In an embodiment, the configuration message comprises at least one of a connection indication indicating the second wireless terminal is connected to the first wireless network node or the second wireless network node, a path indication indicating a path of forwarding the data traffic to the second wireless network node, a master cell group, MCG, backhaul bearer configuration, or a secondary cell group, SCG, backhaul bearer configuration.

In an embodiment, the assistance information includes a Uu RAT of the second wireless terminal.

In an embodiment, the first wireless terminal may receive RAT information from the second wireless terminal, wherein the RAT information includes a Uu RAT of the second wireless terminal.

In an embodiment, the RAT information is received in one of a PC5-S signaling, a PC5 radio resource control, RRC, signaling or an adaptation header of an adaptation packet data unit containing a connection request message.

In an embodiment, the first wireless terminal transmits dual connectivity information related to a dual connectivity of the first wireless terminal to the second wireless terminal.

In an embodiment, the dual connectivity information comprises at least one of an RAT of the first wireless network node, an RAT of the second wireless network node, a dual connectivity indication, at least one cell global identifier of at least one serving cell or a MR-DC type.

Figure 12:
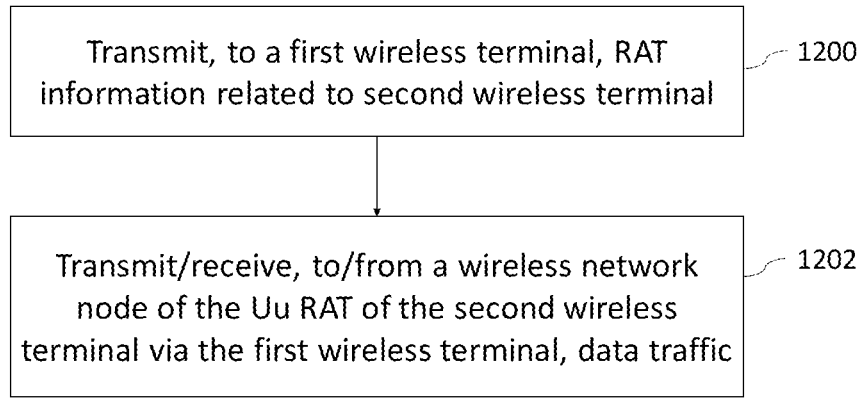
FIG. 12 shows a flowchart of a process according to an embodiment of the present disclosure.

FIG. 12 shows a flowchart of a process according to an embodiment of the present disclosure. The process shown in FIG. 12 may be utilized in the second wireless terminal (e.g. remote UE) and comprise the following steps:

Step 1200: Transmit, to a first wireless terminal (e.g. the relay UE), RAT information related to the second wireless terminal, and Step 1202: Transmit/Receive, to/from a wireless network node (e.g. the BS2) of the Uu RAT of the second wireless terminal via the first wireless terminal, data traffic.

In an embodiment, the RAT information includes a Uu RAT of the second wireless terminal.

In an embodiment, the RAT information is transmitted in one of a PC5-S signaling, a PC5 radio resource control, RRC, signaling or an adaptation header of an adaptation packet data unit containing a connection request message.

In an embodiment, the wireless communication method further comprises receiving, from the first wireless terminal, dual connectivity information related to a dual connectivity of the first wireless terminal.

In an embodiment, the dual connectivity information comprises at least one of an RAT of a master wireless network node, an RAT of a secondary wireless network node, a dual connectivity indication, at least one cell global identifier of at least one serving cell or MR-DC type.

Figure 13:
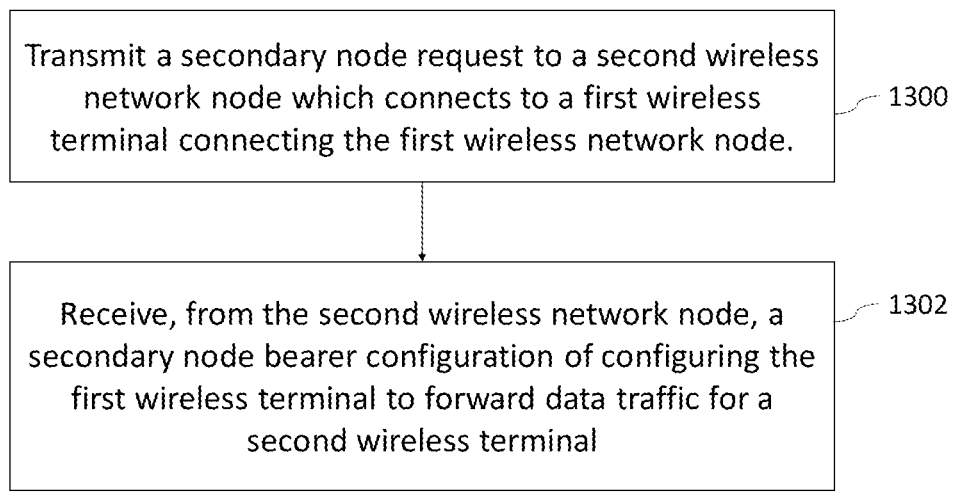
FIG. 13 shows a flowchart of a process according to an embodiment of the present disclosure.

FIG. 13 shows a flowchart of a process according to an embodiment of the present disclosure. The process shown in FIG. 13 may be utilized in the first wireless network node (e.g. BS1) and comprise the following steps:

Step 1300: Transmit a secondary node request to a second wireless network node (e.g. BS2) which connects to a first wireless terminal (e.g. relay UE) connecting the first wireless network node.

Step 1302: Receive, from the second wireless network node, a secondary node bearer configuration of configuring the first wireless terminal to forward data traffic for a second wireless terminal (e.g. remote UE).

More specifically, the first wireless network node transmits the secondary node request to the second wireless network node, to acquire the secondary node bearer configuration of configuring the first wireless terminal to forward data traffic for a second wireless terminal.

In an embodiment, the secondary node request comprises at least one of a list of requested secondary cell group, SCG, backhaul bearer, an SCG backhaul bearer indication, a relaying backhaul bearer indication, a radio bearer type indication, a Uu RB identifier, ID, a Uu RB priority, or a layer 2 ID of the second wireless terminal.

In an embodiment, the secondary node bearer configuration comprises at least one of an SCG backhaul bearer ID, a Uu RB ID allowed to map to the SCG backhaul bearer, a Uu RB priority allowed to map to the SCG backhaul bearer, an SCG backhaul bearer priority, a logical channel ID, a radio-link-control sequence number, RLC SN, length, or the maximum number of retransmissions.

In an embodiment, RRC transfer message(s) is transferred between the first wireless network node and the second wireless network node.

In an embodiment, the RRC transfer message(s) comprises at least one of a layer 2 ID of the second wireless terminal, a Uu signaling radio bearer, SRB, ID of the second wireless terminal, or an RRC container of encapsulating at least one RRC message of the second wireless terminal.

In an embodiment, the secondary node request, the secondary node bearer configuration and/or the RRC transfer message is transmitted via first wireless terminal associated signaling (i.e. signaling associated to the first wireless terminal).

In an embodiment, the first wireless network node receives assistance information related to the second wireless terminal from the first wireless terminal, wherein the assistance information includes a Uu RAT of the second wireless terminal.

In an embodiment, the first wireless network node transmits a configuration message for configuring the first wireless terminal to forward data traffic for the second wireless terminal to the first wireless terminal.

In an embodiment, the configuration message comprises at least one of a connection indication indicating the second wireless terminal is connected to the first wireless network node or the second wireless network node, a path indication indicating a path of forwarding the data traffic, a master cell group, MCG, backhaul bearer configuration, or an SCG backhaul bearer configuration.

In an embodiment, the MCG backhaul bearer configuration or SCG backhaul bearer configuration comprises at least one of a cell group ID, a backhaul bearer indication, a backhaul bearer ID, a Uu RB ID allowed to map to the backhaul bearer, a Uu RB priority allowed to map to the backhaul bearer, an backhaul bearer priority, a backhaul logical channel ID, or an RLC configuration.

Figure 14:
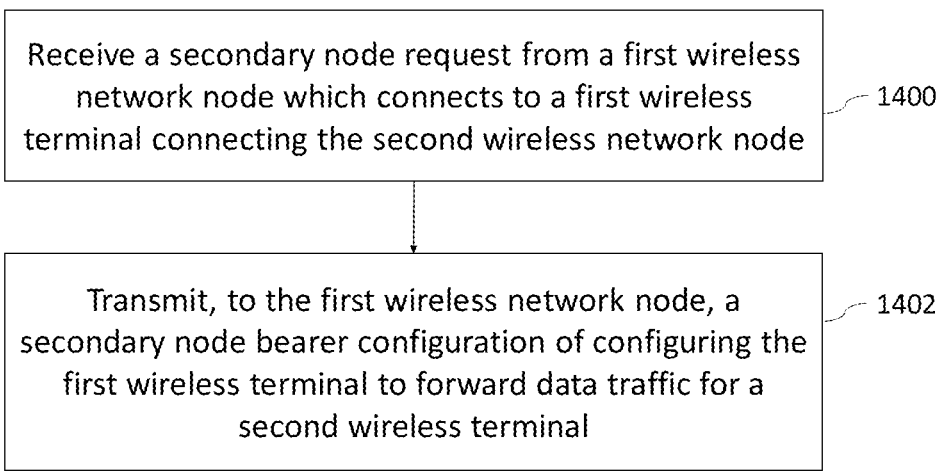
FIG. 14 shows a flowchart of a process according to an embodiment of the present disclosure.

FIG. 14 shows a flowchart of a process according to an embodiment of the present application. The process shown in FIG. 14 may be applied in the second wireless network node (e.g. BS2) and comprise the following steps:

Step 1400: Receive a secondary node request from a first wireless network node (e.g. BS1) which connects to a first wireless terminal (e.g. relay UE) connecting the second wireless network node.

Step 1402: Transmit, to the first wireless network node, a secondary node bearer configuration of configuring the first wireless terminal to forward data traffic for a second wireless terminal (e.g. remote UE).

The detailed operations of the process shown in FIG. 14 may be referred to those of the process shown in FIG. 13 and are not narrated herein for brevity.

Figure 15:
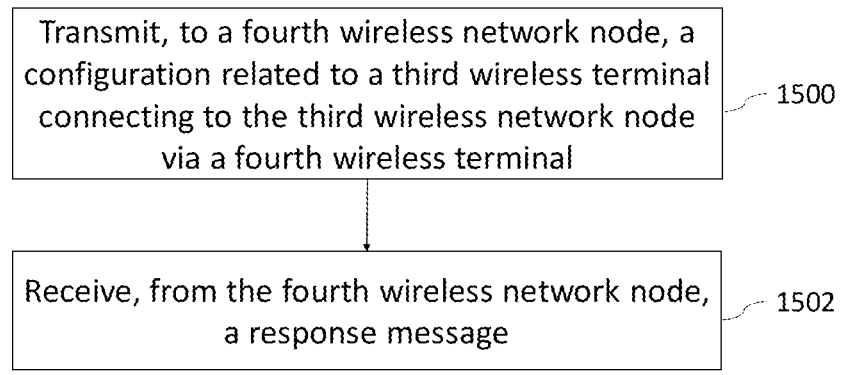
FIG. 15 shows a flowchart of a process according to an embodiment of the present disclosure.

FIG. 15 shows a flowchart of a process according to an embodiment of the present application. The process shown in FIG. 15 may be applied in a third wireless network node and comprise the following steps:

Step 1500: Transmit, to a fourth wireless network node, a configuration related to a third wireless terminal (e.g. remote UE) connecting to the third wireless network node via a fourth wireless terminal (e.g. relay UE);

Step 1502: Receive, from the fourth wireless network node, a response message.

More specifically, when the third wireless network node connects to the third wireless terminal via the fourth wireless terminal, the third wireless network node may transmit the configuration related to the third wireless terminal to the fourth wireless network node which connects to the fourth wireless terminal. Note that the third wireless network node may be one of BS1 and BS2 and the fourth wireless network node may be another one of BS1 and BS2.

In an embodiment, the fourth wireless terminal is in multi-radio dual connectivity with the third wireless network node and the fourth wireless network node and the configuration and the response message are transmitted via fourth wireless terminal associated signaling (i.e. signaling associated to the fourth wireless terminal).

In an embodiment, the configuration comprises at least one of a layer 2 identifier, ID, of the third wireless terminal, a mapping between Uu data radio bearer, DRB, of the third wireless terminal and PC5 backhaul bearer, a configuration of the Uu DRB of the third wireless terminal, a mapping between the Uu DRB of the third wireless terminal and the relaying backhaul bearer which is used by the fourth wireless terminal for relaying data between the third wireless terminal and the third wireless network node, a configuration of the relaying backhaul bearer, or a mapping between the PC5 backhaul bearer and the relaying backhaul bearer.

In an embodiment, the configuration of the relaying backhaul bearer comprises at least one of bearer ID, bearer quality-of-service, QoS, bearer type, uplink configuration, transport network layer, TNL, information of the third wireless network node, PC5 backhaul bearer mapped to the relaying backhaul bearer, Uu DRB mapped to the relaying backhaul bearer, or required sidelink DRB IDs.

In an embodiment, the response message comprises at least one of: a list of SCG BH bearer accepted to configure, a list of SCG BH bearer failed to configure, or failure cause.

Figure 16:
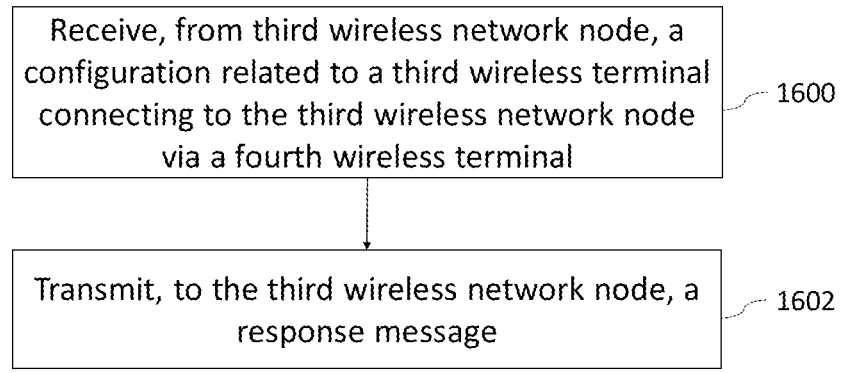
FIG. 16 shows a flowchart of a process according to an embodiment of the present disclosure.

FIG. 16 shows a flowchart of a process according to an embodiment of the present disclosure. The process shown in FIG. 16 may be utilized in the fourth wireless network node and comprises the following steps:

Step 1600: Receive, from a third wireless network node, a configuration related to a third wireless terminal connecting to the third wireless network node via a fourth wireless terminal;

Step 1602: Transmit, to the third wireless network node, a response message.

The details of the process shown in FIG. 16 may be referred to those of the process shown in FIG. 15 and are not narrated herein for brevity.

In an embodiment, the present disclosure discloses a wireless communication method for use in a secondary wireless network node (e.g. BS2). In this embodiment, the wireless communication method comprises:

transmitting, to a master wireless network node (e.g. BS1), a configuration of Uu DRB of a remote wireless terminal (e.g. the remote UE) connecting to the secondary wireless network node via a relay wireless terminal (e.g. the relay UE) in multi-radio dual connectivity that connects to the master wireless network node and the secondary wireless network node, and receiving, from the master wireless network node, a mapping between the Uu DRB and relaying backhaul bearer used by the relay wireless terminal for relaying data between the remote wireless terminal and the secondary wireless network node.

In an embodiment, the Uu DRB configuration may include at least one of: DRB ID or DRB QoS.

In an embodiment, the mapping between Uu DRB and relaying BH bearer may include at least one of: Uu DRB ID(s) priorities mapped to a relaying BH bearer, Uu DRB priority (e.g. QCI or 5QI) mapped to a relaying BH bearer, priority(ies) of Uu DRB mapped to priority(ies) of relaying BH bearer, priority(ies) of PC5 BH bearer logical channel mapped to priority(ies) of relaying BH bearer logical channel, QCI mapping, 5QI mapping, QCI mapped to 5QI, 5QI mapped to QCI.

Figure 17:
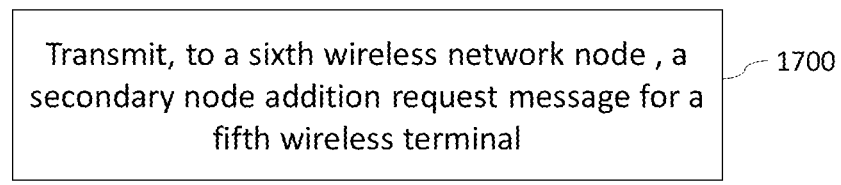
FIG. 17 shows a flowchart of a process according to an embodiment of the present disclosure.

FIG. 17 shows a flowchart of a process according to an embodiment of the present disclosure. The process shown in FIG. 17 may be utilized in the fifth wireless network node (e.g. BS1) and comprises the following step:

Step 1700: Transmit, to a sixth wireless network node (e.g. BS2), a secondary node addition request message for a fifth wireless terminal (e.g. remote UE).

More specifically, the fifth wireless network node transmit a secondary node addition request message to the sixth wireless network node, to add the sixth wireless network node as the secondary node of the fifth wireless terminal which connects to the fifth wireless network node via a sixth wireless terminal (e.g. relay UE).

In an embodiment, the secondary node addition request message comprises at least one of a remote wireless terminal indication, a layer 2 identifier of the fifth wireless terminal, information of a sixth wireless terminal which is used by the fifth wireless terminal to connect to the fifth wireless network node, or a mapping between Uu DRB of the fifth wireless terminal and relaying backhaul bearer of the sixth wireless terminal.

In an embodiment, the process shown in FIG. 17 further comprises transmitting, to the sixth wireless network node, a relaying related information for configuring a relaying backhaul bearer which is used by the sixth wireless terminal for forwarding data of the fifth wireless terminal, and receiving, from the sixth wireless network node, a response message, wherein, the relaying related information and the response message are transmitted via sixth wireless terminal associated signaling (i.e. signaling associated to the sixth wireless terminal).

In an embodiment, the relaying related information comprises at least one of: relay UE type indication, L2 ID of the sixth wireless terminal, a list of served remote UE, the mapping between Uu DRBs of the fifth wireless terminal and relaying BH bearers, relaying backhaul bearer configuration involving the sixth wireless network node.

In an embodiment, the response message comprises at least one of bearer ID, bearer QoS, bearer type, uplink configuration, transport network layer, TNL, information, PC5 backhaul bearer mapped to the relaying backhaul bearer, Uu DRB mapped to the relaying backhaul bearer, an RRC container containing configurations associated to relaying backhaul bearers, or required sidelink DRB IDs.

In an embodiment, the process shown in FIG. 17 further comprises receiving, from the sixth wireless network node, data of a Uu DRB of the fifth wireless terminal terminated at the fifth wireless network node via a transport bearer, wherein the transport bearer is associated to the Uu DRB of the fifth wireless terminal or the relaying backhaul bearer of the sixth wireless terminal.

Figure 18:
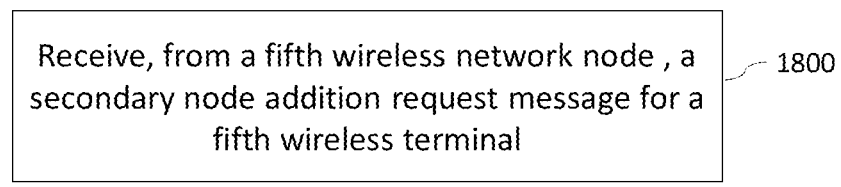
FIG. 18 shows a flowchart of a process according to an embodiment of the present disclosure.

FIG. 18 shows a flowchart of a process according to an embodiment of the present disclosure. The process shown in FIG. 18 may be utilized in the sixth wireless network node (e.g. BS2) and comprises the following step:

Step 1800: Receive, from a fifth wireless network node (e.g. BS1), a secondary node addition request message for a fifth wireless terminal (e.g. remote UE), In an embodiment, the secondary node addition request message comprises at least one of a remote wireless terminal indication, a layer 2 identifier of the fifth wireless terminal, information of a sixth wireless terminal (e.g. relay UE) which is used by the fifth wireless terminal to connect to the fifth wireless network node, or a mapping between Uu DRB of the fifth wireless terminal and relaying backhaul bearer of the sixth wireless terminal.

In an embodiment, the process shown in FIG. 18 further comprises:

receiving, from the fifth wireless network node, a relaying related information for configuring a relaying backhaul bearer which is used by the sixth wireless terminal for forwarding data of the fifth wireless terminal, and transmitting, to the fifth wireless network node, a response message, wherein, the relaying related information and the response message are transmitted via the sixth wireless terminal associated signaling.

In an embodiment, the relaying related information comprises at least one of: relay UE type indication, L2 ID of the sixth wireless terminal, a list of served remote UE, the mapping between Uu DRBs of the fifth wireless terminal and relaying BH bearers, relaying BH bearer configuration involving the sixth wireless network node.

In an embodiment, the response message comprises at least one of bearer ID, bearer QoS, bearer type, uplink configuration, transport network layer, TNL, information, PC5 backhaul bearer mapped to the relaying backhaul bearer, Uu DRB mapped to the relaying backhaul bearer, an RRC container containing configurations associated to relaying backhaul bearers, or required sidelink DRB IDs.

In an embodiment, the process shown in FIG. 18 further comprises:

receiving, from the sixth wireless terminal, data of the fifth wireless terminal terminated at the fifth wireless network node via the relaying backhaul bearer of the sixth wireless terminal, mapping the data to a transport bearer associated to the Uu DRB of the fifth wireless terminal or the relaying backhaul bearer of the sixth wireless terminal, and transmitting, to the fifth wireless network node, the transport bearer.

In an embodiment, the process shown in FIG. 18 further comprises:

receiving, from the fifth wireless network node, data of a Uu DRB of the fifth wireless terminal terminated at the sixth wireless network node is mapped via the transport layer, wherein the transport layer is associated to the Uu DRB of the fifth wireless terminal or the relaying backhaul bearer of the sixth wireless terminal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a first wireless terminal, the wireless communication method comprising:
   transmitting, to a first wireless network node, assistance information related to a second wireless terminal, and
   receiving, from the first wireless network node, a configuration message of configuring the first wireless terminal to forward data traffic for the second wireless terminal,
   wherein the assistance information includes a Uu radio access technology (RAT) of the second wireless terminal,
   wherein the first wireless terminal is in multi-radio dual connectivity with the first wireless network node and a second wireless network node,
   wherein the configuration message comprises at least one of: a connection indication indicating the second wireless terminal is connected to the first wireless network node or the second wireless network node, a path indication indicating a path of forwarding the data traffic to the second wireless network node, a master cell group (MCG) backhaul bearer configuration, or a secondary cell group (SCG) backhaul bearer configuration.

2. The wireless communication method of claim 1, further comprising:
   receiving, from the second wireless terminal, RAT information including a Uu RAT of the second wireless terminal,
   wherein the RAT information is received in one of a PC5-S signaling, a PC5 radio resource control (RRC) signaling or an adaptation header of an adaptation packet data unit containing a connection request message.

3. The wireless communication method of claim 1, further comprising:
   transmitting, to the second wireless terminal, dual connectivity information related to a dual connectivity of the first wireless terminal.

4. The wireless communication method of claim 3, wherein the dual connectivity information comprises at least one of an RAT of the first wireless network node, an RAT of the second wireless network node, a dual connectivity indication, at least one cell global identifier of at least one serving cell or a multi-Radio dual connectivity (MR-DC) type.

5. A wireless communication method for use in a first wireless network node, the wireless communication method comprising:
   transmitting a secondary node request to a second wireless network node which connects to a first wireless terminal connecting the first wireless network node,
   receiving, from the second wireless network node, a secondary node bearer configuration of configuring the first wireless terminal to forward data traffic for a second wireless terminal,
   receiving, from the first wireless terminal, assistance information related to the second wireless terminal, wherein the assistance information includes a Uu RAT of the second wireless terminal, and
   transmitting, to the first wireless terminal, a configuration message of configuring the first wireless terminal to forward the data traffic for the second wireless terminal.

6. The wireless communication method of claim 5, wherein the secondary node request comprises at least one of a list of requested secondary cell group (SCG) backhaul bearer, an SCG backhaul bearer indication, a relaying backhaul bearer indication, a radio bearer type indication, a Uu RB identifier (ID) a Uu RB priority, or a layer 2 ID of the second wireless terminal.

7. The wireless communication method of claim 6, wherein the secondary node request and the secondary node bearer configuration are transmitted via first wireless terminal associated signaling.

8. The wireless communication method of claim 5, wherein the secondary node bearer configuration comprises at least one of an SCG backhaul bearer ID, a Uu RB ID allowed to map to the SCG backhaul bearer, a Uu RB priority allowed to map to the SCG backhaul bearer, an SCG backhaul bearer priority, a logical channel ID, a radio-link-control sequence number (RLC SN) length, or the maximum number of retransmissions.

9. The wireless communication method of claim 5, further comprising:
   transmitting, to the second wireless network node, a radio resource control (RRC) transfer message between the first wireless network node and the second wireless network node,
   wherein the RRC transfer message comprising at least one of a layer 2 ID of the second wireless terminal, a Uu signaling radio bearer (SRB) ID of the second wireless terminal, or an RRC container of encapsulating at least one control message of the second wireless terminal.

10. The wireless communication method of claim 9, wherein the RRC transfer message is transmitted via first wireless terminal associated signaling.

11. The wireless communication method of claim 5, wherein the configuration message comprises at least one of a connection indication indicating the second wireless terminal is connected to the first wireless network node or the second wireless network node, a path indication indicating a path of forwarding the data traffic, a master cell group (MCG) backhaul bearer configuration, or an SCG backhaul bearer configuration.

12. The wireless communication method of claim 11, wherein the configuration of the MCG or SCG backhaul bearer comprises at least one of a cell group ID, a backhaul bearer indication, a backhaul bearer ID, a Uu RB ID allowed to map to the backhaul bearer, a Uu RB priority allowed to map to the backhaul bearer, a backhaul bearer priority, a backhaul logical channel ID, or a radio-link-control (RLC) configuration.

13. A wireless communication method for use in a second wireless network node, the wireless communication method comprising:
   receiving a secondary node request from a first wireless network node which connects to a first wireless terminal connecting the second wireless network node,
   transmitting, to the first wireless network node, a secondary node bearer configuration of configuring the first wireless terminal to forward data traffic for a second wireless terminal, and
   receiving, from the first wireless network node, a radio resource control (RRC) transfer message between the first wireless network node and the second wireless network node, wherein the RRC transfer message comprises at least one of a layer 2 ID of the second wireless terminal, a Uu signaling resource bearer (SRB) ID of the second wireless terminal, or an RRC container of encapsulating at least one control message of the second wireless terminal.

14. The wireless communication method of claim 13, wherein the secondary node request comprises at least one of a list of requested secondary cell group, SCG, backhaul bearer, an SCG backhaul bearer indication, a relaying backhaul bearer indication, a radio bearer type indication, a Uu RB identifier (ID) a Uu RB priority, or a layer 2 ID of the first wireless terminal.

15. The wireless communication method of claim 13, wherein the secondary node bearer configuration comprises at least one of an SCG backhaul bearer ID, a Uu RB ID allowed to map to the SCG backhaul bearer, a Uu RB priority allowed to map to the SCG backhaul bearer, an SCG backhaul bearer priority, a logical channel ID, a radio-link-control sequence number (RLC SN) length, or the maximum number of retransmissions.

16. A first wireless terminal, comprising:
at least one processor; and
a memory, which is configured to store at least one program;
wherein the at least one program, when executed by the at least one processor, enables the at least one processor to perform:
   transmitting, to a first wireless network node, assistance information related to a second wireless terminal, and
   receiving, from the first wireless network node, a configuration message of configuring the first wireless terminal to forward data traffic for the second wireless terminal,
   wherein the assistance information includes a Uu radio access technology (RAT) of the second wireless terminal,
   wherein the first wireless terminal is in multi-radio dual connectivity with the first wireless network node and a second wireless network node,
   wherein the configuration message comprises at least one of: a connection indication indicating the second wireless terminal is connected to the first wireless network node or the second wireless network node, a path indication indicating a path of forwarding the data traffic to the second wireless network node, a master cell group (MCG) backhaul bearer configuration, or a secondary cell group (SCG) backhaul bearer configuration.

17. A first wireless network node, comprising:
at least one processor; and
a memory, which is configured to store at least one program;
wherein the at least one program, when executed by the at least one processor, enables the at least one processor to perform:
   transmitting a secondary node request to a second wireless network node which connects to a first wireless terminal connecting the first wireless network node,
   receiving, from the second wireless network node, a secondary node bearer configuration of configuring the first wireless terminal to forward data traffic for a second wireless terminal,
   receiving, from the first wireless terminal, assistance information related to the second wireless terminal, wherein the assistance information includes a Uu RAT of the second wireless terminal, and
   transmitting, to the first wireless terminal, a configuration message of configuring the first wireless terminal to forward the data traffic for the second wireless terminal.

18. A second wireless network node, comprising:
at least one processor; and
a memory, which is configured to store at least one program;
wherein the at least one program, when executed by the at least one processor, enables the at least one processor to perform:
   receiving a secondary node request from a first wireless network node which connects to a first wireless terminal connecting the second wireless network node,
   transmitting, to the first wireless network node, a secondary node bearer configuration of configuring the first wireless terminal to forward data traffic for a second wireless terminal, and
   receiving, from the first wireless network node, a radio resource control (RRC) transfer message between the first wireless network node and the second wireless network node,
   wherein the RRC transfer message comprises at least one of a layer 2 ID of the second wireless terminal, a Uu signaling resource bearer (SRB) ID of the second wireless terminal, or an RRC container of encapsulating at least one control message of the second wireless terminal.

* * * * *